(12) United States Patent
Tsutsumi (10) Patent No.: US 11,158,462 B2
(45) Date of Patent: Oct. 26, 2021

(54) MULTILAYER CERAMIC CAPACITOR AND MULTILAYER CERAMIC CAPACITOR MOUNT STRUCTURE

(71) Applicant: Murata Manufacturing Co., Ltd., Nagaokakyo (JP)

(72) Inventor: Hironori Tsutsumi, Nagaokakyo (JP)

(73) Assignee: MURATA MANUFACTURING COMPANY, LTD., Kyoto (JP)

( * ) Notice: Subject to any disclaimer, the term of this patent is extended or adjusted under 35 U.S.C. 154(b) by 88 days.

(21) Appl. No.: 16/787,067

(22) Filed: Feb. 11, 2020

(65) Prior Publication Data
US 2020/0273622 A1    Aug. 27, 2020

(30) Foreign Application Priority Data

Feb. 21, 2019    (JP) .............................. JP2019-029590

(51) Int. Cl.
| | |
|---|---|
| *H01G 4/30* | (2006.01) |
| *H01G 2/06* | (2006.01) |
| *H01G 4/012* | (2006.01) |
| *H01G 4/12* | (2006.01) |

(52) U.S. Cl.
CPC .............. *H01G 4/30* (2013.01); *H01G 2/065* (2013.01); *H01G 4/012* (2013.01); *H01G 4/1209* (2013.01)

(58) Field of Classification Search
CPC .......... H01G 4/12; H01G 4/1209; H01G 2/06; H01G 2/065; H01G 4/005; H01G 4/012; H01G 4/232; H01G 4/30; H01G 4/38; H01G 4/248; H05K 1/182
See application file for complete search history.

(56) References Cited

U.S. PATENT DOCUMENTS

| | | | |
|---|---|---|---|
| 2015/0294792 A1* | 10/2015 | Schossmann | H01G 4/005 361/301.4 |
| 2016/0240316 A1 | 8/2016 | Onoue et al. | |
| 2017/0069437 A1* | 3/2017 | Jeong | H01G 4/012 |
| 2021/0035739 A1* | 2/2021 | Lee | H01G 4/1218 |

FOREIGN PATENT DOCUMENTS

JP    2016-149487 A    8/2016

* cited by examiner

*Primary Examiner* — Michael P McFadden
(74) *Attorney, Agent, or Firm* — Keating & Bennett, LLP (57) ABSTRACT

A multilayer ceramic capacitor includes a ceramic body including a laminated dielectric layers and laminated internal electrodes, and four external electrodes. The ceramic body includes a first capacitance portion and a second capacitance portion aligned with each other in a lamination direction. The four external electrodes are electrically connected to the internal electrodes in the first capacitance portion that are extracted to a first end surface, the internal electrodes in the first capacitance portion that are extracted to a second end surface, the internal electrodes in the second capacitance portion that are extracted to the first end surface, and the internal electrodes in the second capacitance portion that are extracted to the second end surface, respectively. A dimension in the lamination direction of the ceramic body is smaller than a dimension in a width direction of the ceramic body.

13 Claims, 9 Drawing Sheets

MULTILAYER CERAMIC CAPACITOR AND MULTILAYER CERAMIC CAPACITOR MOUNT STRUCTURE

CROSS REFERENCE TO RELATED APPLICATIONS

This application claims the benefit of priority to Japanese Patent Application No. 2019-029590 filed on Feb. 21, 2019, the entire contents of which are hereby incorporated by reference.

BACKGROUND OF THE INVENTION

1. Field of the Invention

The present invention relates to a multilayer ceramic capacitor and a multilayer ceramic capacitor mount structure.

2. Description of the Related Art

In recent years, with the decreasing size of products having electronic components mounted thereon, mounting space for electronic components is becoming smaller.

Japanese Patent Laid-Open No. 2016-149487 describes a multilayer ceramic capacitor which includes a laminated body having a plurality of alternately laminated internal electrodes and dielectric layers, and a pair of external electrodes provided on a surface of the laminated body, and which is embedded in a substrate. As shown in FIG. 12 of Japanese Patent Laid-Open No. 2016-149487, the paired external electrodes of this multilayer ceramic capacitor are electrically connected to two electrodes provided on one main surface of the substrate, respectively.

The multilayer ceramic capacitor described in Japanese Patent Laid-Open No. 2016-149487, however, can be electrically connected only to the electrodes provided on one main surface of the substrate. Therefore, when the multilayer ceramic capacitor embedded in the substrate is configured to be electrically connected to electrodes provided not only on one main surface but also on the other main surface of the substrate, it is necessary to embed two multilayer ceramic capacitors in a thickness direction of the substrate, resulting in an increased thickness of the substrate.

SUMMARY OF THE INVENTION

Preferred embodiments of the present invention provide multilayer ceramic capacitors that are each able to be electrically connected, when embedded in a substrate, to electronic components provided on opposite main surfaces of the substrate, and multilayer ceramic capacitor mount structures in each of which such a multilayer ceramic capacitor is mounted on a substrate.

A multilayer ceramic capacitor according to a preferred embodiment of the present invention includes a ceramic body, the ceramic body including a plurality of laminated dielectric layers and a plurality of laminated internal electrodes. The ceramic body includes a first main surface and a second main surface opposing each other in a lamination direction, a first side surface and a second side surface opposing each other in a width direction orthogonal or substantially orthogonal to the lamination direction, and a first end surface and a second end surface opposing each other in a length direction orthogonal or substantially orthogonal to both the lamination direction and the width direction. A first external electrode is provided on the first end surface on a side of the first main surface of the ceramic body, a second external electrode is provided on the second end surface on a side of the first main surface of the ceramic body, a third external electrode is provided on the first end surface on a side of the second main surface of the ceramic body, and a fourth external electrode is provided on the second end surface on a side of the second main surface of the ceramic body. The ceramic body includes a first capacitance portion and a second capacitance portion aligned with each other in the lamination direction, the first external electrode being electrically connected to the internal electrodes in the first capacitance portion that are extracted to the first end surface, the second external electrode being electrically connected to the internal electrodes in the first capacitance portion that are extracted to the second end surface, the third external electrode being electrically connected to the internal electrodes in the second capacitance portion that are extracted to the first end surface, the fourth external electrode being electrically connected to the internal electrodes in the second capacitance portion that are extracted to the second end surface, and a total dimension in the lamination direction of the ceramic body being smaller than a total dimension in the width direction of the ceramic body.

The total dimension in the lamination direction of the ceramic body may preferably not be more than about 0.21 mm.

Each of the first external electrode, the second external electrode, the third external electrode and the fourth external electrode may include a plated layer including Cu as an outermost layer.

One of the first capacitance portion and the second capacitance portion may have a capacitance of about 0.01 µF±10%, and another one of the first capacitance portion and the second capacitance portion may have a capacitance of about 0.1 µF±10%.

In a multilayer ceramic capacitor mount structure according to a preferred embodiment of the present invention, the multilayer ceramic capacitor described above is embedded in a substrate, the first external electrode and the second external electrode are electrically connected to a first circuit provided on a first main surface of the substrate, with a first connecting conductor and a second connecting conductor provided within the substrate interposed therebetween, respectively, and the third external electrode and the fourth external electrode are electrically connected to a second circuit provided on a second main surface of the substrate, with a third connecting conductor and a fourth connecting conductor provided within the substrate interposed therebetween, respectively.

In the multilayer ceramic capacitors according to preferred embodiments of the present invention, the ceramic body includes the first capacitance portion and the second capacitance portion aligned with each other in the lamination direction, the first external electrode and the second external electrode are electrically connected to the internal electrodes included in the first capacitance portion, and the third external electrode and the fourth external electrode are electrically connected to the internal electrodes included in the second capacitance portion. Such a configuration enables the multilayer ceramic capacitors according to preferred embodiments of the present invention to be, when embedded in a substrate, electrically connected to electronic components and the like provided on opposite main surfaces of the substrate. Thus, there is no need to embed two multilayer ceramic capacitors in the thickness direction of the substrate.

Accordingly, an increase in thickness of the substrate is able to be reduced or prevented, and size reduction of the product is able to be achieved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Features of the present invention are specifically described below with reference to preferred embodiments of present invention and the accompanying drawings.

First Preferred Embodiment

Figure 1:
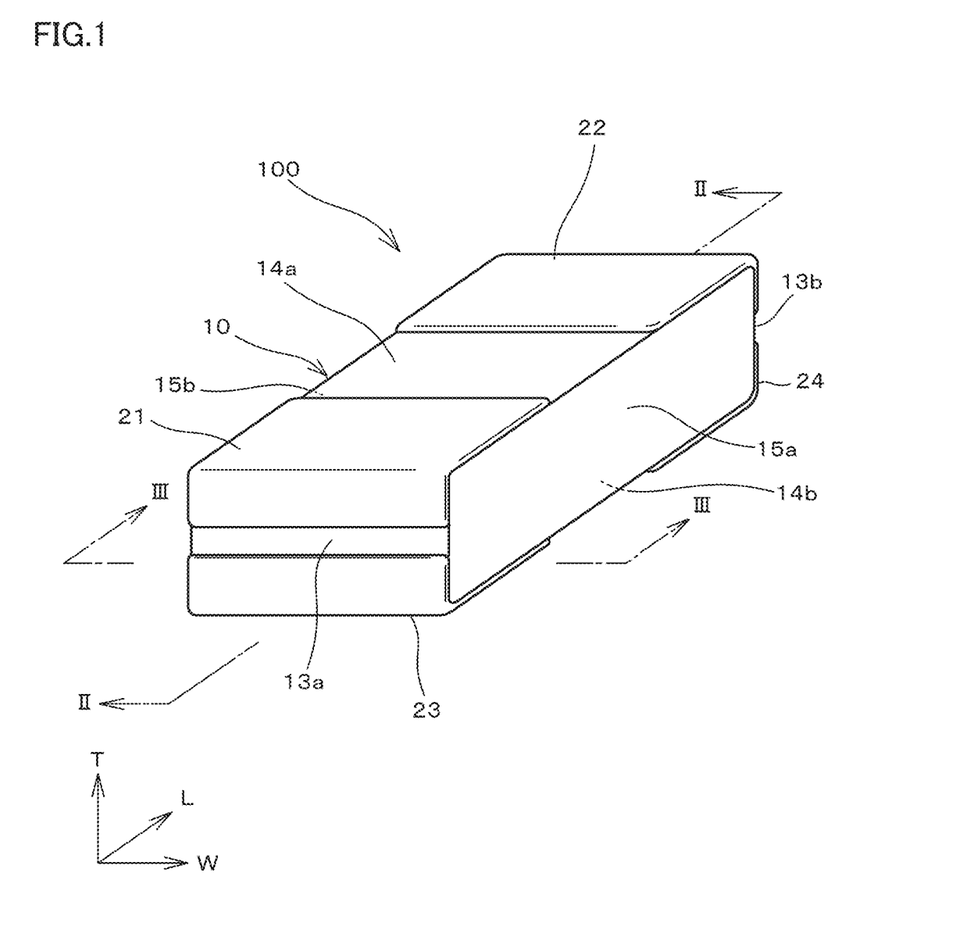
FIG. 1 is a perspective view of a multilayer ceramic capacitor in a preferred embodiment of the present invention.
Figure 2:
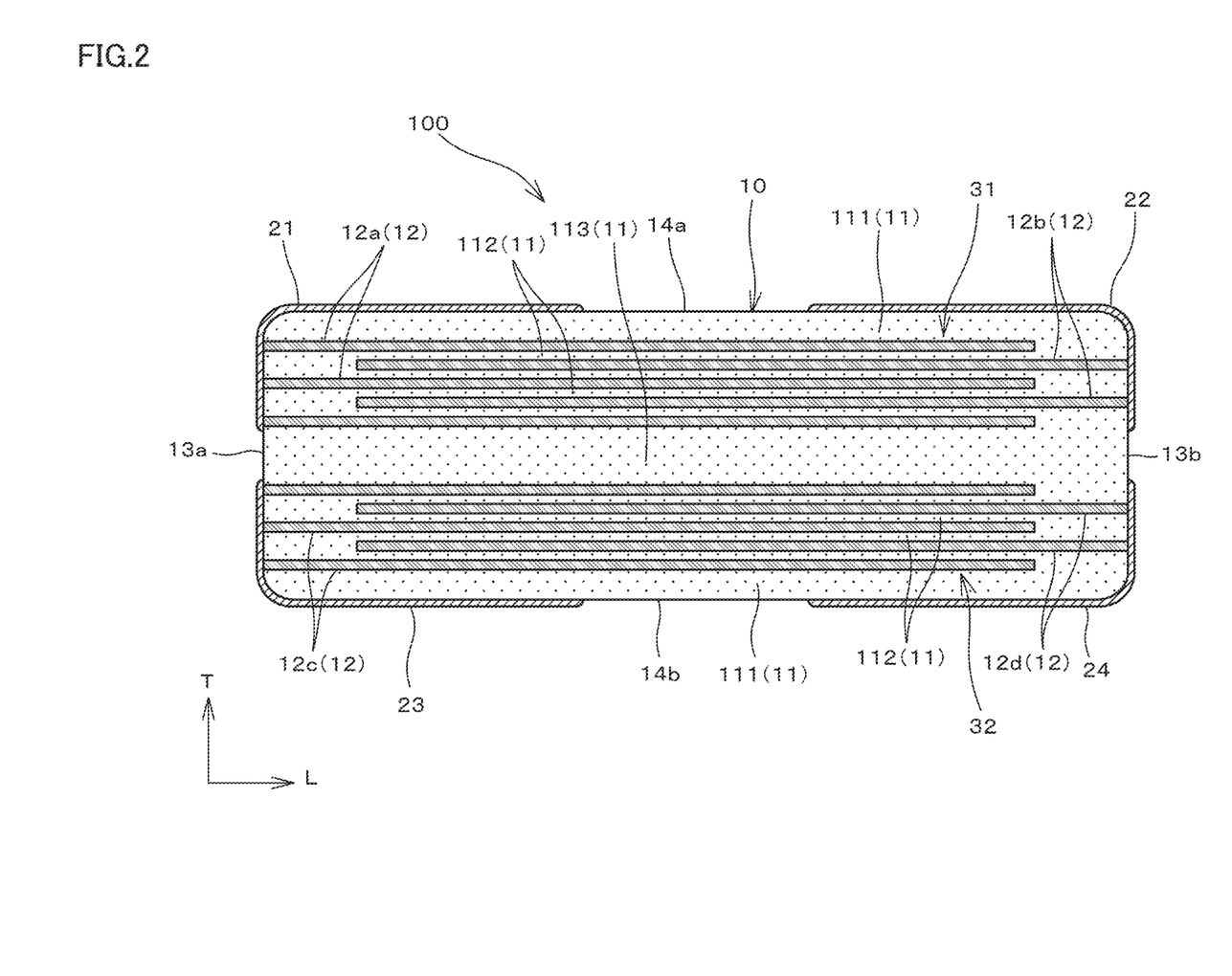
FIG. 2 is a cross-sectional view along the line II-II of the multilayer ceramic capacitor shown in FIG. 1.
Figure 3:
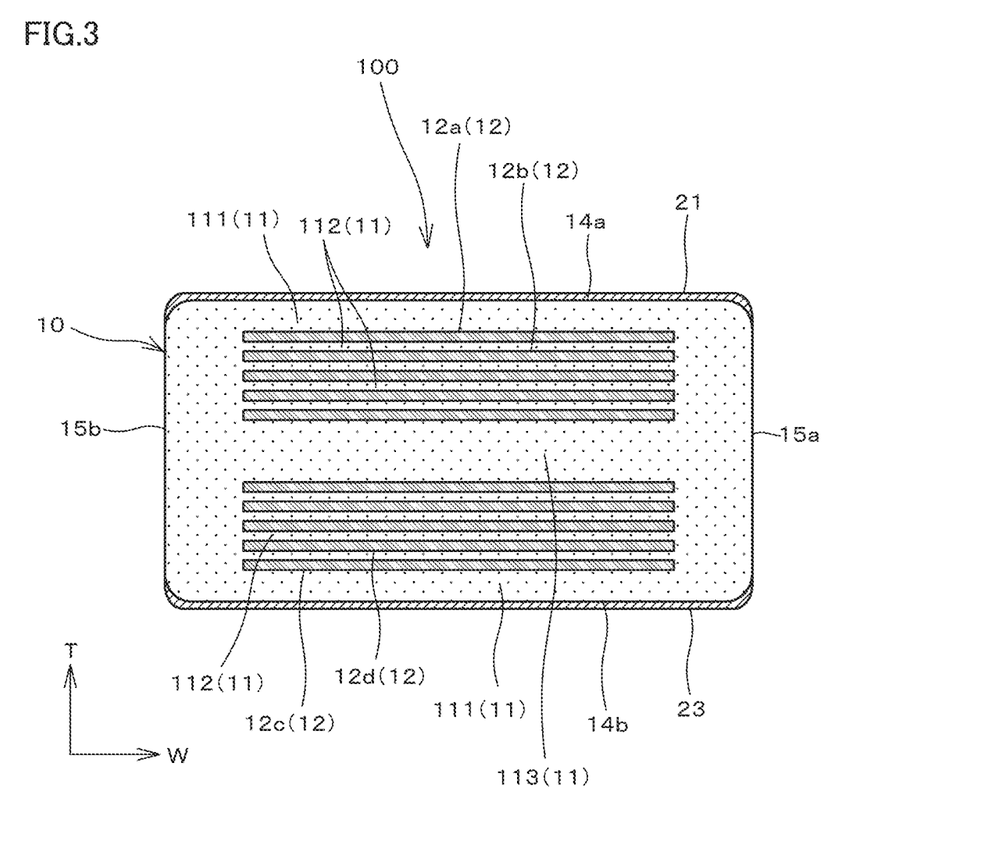
FIG. 3 is a cross-sectional view along the line III-III of the multilayer ceramic capacitor shown in FIG. 1.

FIG. 1 is a perspective view of a multilayer ceramic capacitor 100 in a first preferred embodiment of the present invention. FIG. 2 is a cross-sectional view along the line II-II of multilayer ceramic capacitor 100 shown in FIG. 1. FIG. 3 is a cross-sectional view along the line III-III of multilayer ceramic capacitor 100 shown in FIG. 1.

As shown in FIGS. 1 to 3, multilayer ceramic capacitor 100 is preferably an electronic component generally having a rectangular or substantially rectangular parallelepiped shape, and includes a ceramic body 10, a first external electrode 21, a second external electrode 22, a third external electrode 23, and a fourth external electrode 24.

Multilayer ceramic capacitor 100 including ceramic body 10 and four external electrodes 21 to 24 preferably has a dimension in a length direction L of, for example, not less than about 0.45 mm and not more than about 1.10 mm, a dimension in a width direction W of, for example, not less than about 0.45 mm and not more than about 1.10 mm, and a dimension in a lamination direction T of, for example, not less than about 0.45 mm and not more than about 1.10 mm, for example. These dimensions include a tolerance of about 10%, for example.

Ceramic body 10 includes a first end surface 13a and a second end surface 13b opposing each other in length direction L, a first main surface 14a and a second main surface 14b opposing each other in lamination direction T, and a first side surface 15a and a second side surface 15b opposing each other in width direction W.

It is preferable that a relationship of T1<W1<L1 is satisfied, with L1 representing a dimension in length direction L of ceramic body 10, W1 representing a dimension in width direction W of ceramic body 10, and T1 representing a dimension in lamination direction T of ceramic body 10. Dimension L1 in length direction L of ceramic body 10 is preferably not less than about 0.4 mm and not more than about 1.0 mm, for example, dimension W1 in width direction W is preferably not less than about 0.2 mm and not more than about 0.5 mm, for example, and dimension T1 in lamination direction T is preferably not less than about 0.05 mm and not more than about 0.2 mm, for example. Multilayer ceramic capacitor 100 can be used when embedded in a substrate, in which case dimension T1 in lamination direction T of ceramic body 10 is more preferably not more than about 0.1 mm, for example. The dimensions described above include a tolerance of about 10%, for example.

A corner portion and a ridgeline portion of ceramic body 10 are preferably rounded. The corner portion refers to a portion where three surfaces of ceramic body 10 meet one another, and the ridgeline portion refers to a portion where two surfaces of ceramic body 10 meet each other.

As shown in FIGS. 2 and 3, ceramic body 10 includes a plurality of laminated dielectric layers 11 and a plurality of laminated internal electrodes 12. The plurality of internal electrodes 12 include a plurality of first internal electrodes 12a, a plurality of second internal electrodes 12b, a plurality of third internal electrodes 12c, and a plurality of fourth internal electrodes 12d.

Ceramic body 10 includes a first capacitance portion 31 and a second capacitance portion 32 aligned with each other in lamination direction T. First capacitance portion 31 is located on a side of first main surface 14a, and second capacitance portion 32 is located on a side of second main surface 14b.

First capacitance portion 31 includes a structure in which the plurality of first internal electrodes 12a and the plurality of second internal electrodes 12b are alternately laminated with dielectric layers 11 interposed therebetween in lamination direction T. Second capacitance portion 32 includes a structure in which the plurality of third internal electrodes 12c and the plurality of fourth internal electrodes 12d are alternately laminated with dielectric layers 11 interposed therebetween in lamination direction T.

Dielectric layers 11 include outer layer dielectric layers 111 located on opposite outer sides in lamination direction T of ceramic body 10, inner layer dielectric layers 112 located between first internal electrodes 12a and second internal electrodes 12b as well as between third internal electrodes 12c and fourth internal electrodes 12d, and an inter-capacitance-portion dielectric layer 113 located between first capacitance portion 31 and second capacitance portion 32.

Dielectric layer 11 is preferably made of a ceramic material mainly including, for example, $BaTiO_3$, $CaTiO_3$, $SrTiO_3$, or $CaZrO_3$. To the main component described above, a sub-component lower in content than the main component, such as a Mn compound, a Fe compound, a Cr compound, a Co compound, or a Ni compound, for example, may be added.

Outer layer dielectric layer 111 preferably has a thickness of not less than about 20 μm, for example. With outer layer dielectric layer 111 having a thickness of not less than 20 μm, moisture is less likely to enter multilayer ceramic capacitor 100, so that moisture resistance can be ensured.

Inner layer dielectric layer 112 is preferably included in each of first capacitance portion 31 and second capacitance portion 32. Inner layer dielectric layer 112 preferably has a thickness of not less than about 0.3 μm and not more than about 1.5 μm, for example. To increase a capacitance, the thickness of inner layer dielectric layer 112 is preferably not more than about 0.8 μm, and more preferably not more than about 0.5 μm, for example. The number of inner layer dielectric layers 112 is preferably not less than 20 and not more than 100, for example.

Inter-capacitance-portion dielectric layer 113 preferably has a thickness of not less than about 20 μm and not more than about 100 μm, for example.

First internal electrode 12a and second internal electrode 12b are internal electrodes defining first capacitance portion 31. First internal electrode 12a is extracted to first end surface 13a of ceramic body 10. Second internal electrode 12b is extracted to second end surface 13b of ceramic body 10.

Third internal electrode 12c and fourth internal electrode 12d are internal electrodes defining second capacitance portion 32. Third internal electrode 12c is extracted to first end surface 13a of ceramic body 10. Fourth internal electrode 12d is extracted to second end surface 13b of ceramic body 10.

Ceramic body 10 may preferably include, in addition to first internal electrode 12a, second internal electrode 12b, third internal electrode 12c and fourth internal electrode 12d, an internal electrode not exposed at a surface.

First internal electrode 12a preferably includes a facing electrode portion which opposes second internal electrode 12b, and an extracted electrode portion which is extracted from the facing electrode portion to first end surface 13a of ceramic body 10. Second internal electrode 12b preferably includes a facing electrode portion which opposes first internal electrode 12a, and an extracted electrode portion which is extracted from the facing electrode portion to second end surface 13b of ceramic body 10. The facing electrode portion of first internal electrode 12a and the facing electrode portion of second internal electrode 12b oppose each other with dielectric layer 11 interposed therebetween to define a capacitance, thus defining first capacitance portion 31.

Similarly, third internal electrode 12c preferably includes a facing electrode portion which opposes fourth internal electrode 12d, and an extracted electrode portion which is extracted from the facing electrode portion to first end surface 13a of ceramic body 10. Fourth internal electrode 12d preferably includes a facing electrode portion which opposes third internal electrode 12c, and an extracted electrode portion which is extracted from the facing electrode portion to second end surface 13b of ceramic body 10. The facing electrode portion of third internal electrode 12c and the facing electrode portion of fourth internal electrode 12d oppose each other with dielectric layer 11 interposed therebetween to define a capacitance, thus defining second capacitance portion 32.

First internal electrode 12a, second internal electrode 12b, third internal electrode 12c, and fourth internal electrode 12d each preferably include, for example, a metal such as Cu, Ni, Ag, Pd, Ti, Cr and Au, or an alloy mainly including those metals. First internal electrode 12a, second internal electrode 12b, third internal electrode 12c and fourth internal electrode 12d may each include, as a co-material, dielectric particles based on the same composition as the ceramics included in dielectric layer 11.

The number of internal electrodes 12 including first internal electrode 12a, second internal electrode 12b, third internal electrode 12c and fourth internal electrode 12d is preferably not less than 10 and not more than 100, for example. Internal electrode 12 preferably has a thickness of not less than about 0.3 μm and not more than about 0.7 μm, for example.

The metal of internal electrode 12 is preferably diffused to external electrodes 21 to 24. As a result of the diffusion of the metal of internal electrode 12 to external electrodes 21 to 24, the metal of external electrodes 21 to 24 expands in volume to fill minute interstices in the electrodes, thus improving the effect of reducing or preventing the entry of moisture. The diffusion of the metal of internal electrode 12 to external electrodes 21 to 24 is preferably not less than about 4 μm, for example.

A glass layer may be provided at the portion where first internal electrode 12a and third internal electrode 12c are exposed at first end surface 13a, and at the portion where second internal electrode 12b and fourth internal electrode 12d are exposed at second end surface 13b. By forming the glass layers, moisture resistance and plating resistance can be ensured even if external electrodes 21 to 24 have low compactness, and the entry of moisture from outside can be reduced or prevented to improve the moisture resistance and the plating resistance.

First capacitance portion 31 and second capacitance portion 32 each preferably have a capacitance of not less than about 0.01 μF and not more than about 0.1 μF, for example. First capacitance portion 31 and second capacitance portion 32 may have the same capacitance or different capacitances. The capacitance as used here refers to a capacitance at about 25° C. according to the EKA standard. The capacitance includes a tolerance of about ±10%, for example. For example, one of first capacitance portion 31 and second capacitance portion 32 preferably has a capacitance of 0.01 μF±10%, and the other preferably has a capacitance of 0.1 μF±10%. Both may have the same capacitance.

The thickness of dielectric layer 11, and the thickness of each of first internal electrode 12a, second internal electrode 12b, third internal electrode 12c and fourth internal electrode 12d can be measured with a method below.

First, a surface defined by lamination direction T and width direction W of ceramic body 10, namely, a surface orthogonal or substantially orthogonal to length direction L of ceramic body 10, is polished to expose the cross section, and the cross section is observed with a scanning electronic microscope. Next, the thickness of dielectric layer 11 is measured on a total of five lines, the lines being a centerline along lamination direction T which passes through the center of the exposed cross section, and two lines drawn on each of opposite sides of the centerline at an equal interval. An average value of five measurement values is defined as the thickness of dielectric layer 11.

To determine a more accurate thickness, ceramic body 10 is divided into an upper portion, a central portion and a lower portion in lamination direction T, five measurement values described above are determined for each of the upper portion, the central portion and the lower portion, and an average value of all obtained measurement values is defined as the thickness of dielectric layer 11.

While the method of measuring the thickness of dielectric layer 11 has been described above, the thickness of each of first internal electrode 12a, second internal electrode 12b, third internal electrode 12c and fourth internal electrode 12d can alternatively be measured with a scanning electronic microscope, for the same cross section as that used for measuring the thickness of dielectric layer 11, with a method according to the method of measuring the thickness of dielectric layer 11.

First external electrode 21 is provided on first end surface 13a on a side of first main surface 14a of ceramic body 10. In the present preferred embodiment, as shown in FIGS. 1 and 2, first external electrode 21 is provided to extend from first end surface 13a on the side of first main surface 14a to first main surface 14a on a side of first end surface 13a of ceramic body 10. First external electrode 21 is electrically connected to first internal electrodes 12a in first capacitance portion 31 that are extracted to first end surface 13a.

Second external electrode 22 is provided on second end surface 13b on a side of first main surface 14a of ceramic body 10. In the present preferred embodiment, as shown in FIGS. 1 and 2, second external electrode 22 is provided to extend from second end surface 13b on the side of first main surface 14a to first main surface 14a on a side of second end surface 13b of ceramic body 10. Second external electrode 22 is electrically connected to second internal electrodes 12b in first capacitance portion 31 that are extracted to second end surface 13b.

Third external electrode 23 is provided on first end surface 13a on a side of second main surface 14b of ceramic body 10. In the present preferred embodiment, as shown in FIG. 2, third external electrode 23 is provided to extend from first end surface 13a on the side of second main surface 14b to second main surface 14b on a side of first end surface 13a of ceramic body 10. Third external electrode 23 is electrically connected to third internal electrodes 12c in second capacitance portion 32 that are extracted to first end surface 13a.

Fourth external electrode 24 is provided on second end surface 13b on a side of second main surface 14b of ceramic body 10. In the present preferred embodiment, as shown in FIG. 2, fourth external electrode 24 is provided to extend from second end surface 13b on the side of second main surface 14b to second main surface 14b on a side of second end surface 13b of ceramic body 10. Fourth external electrode 24 is electrically connected to fourth internal electrodes 12d in second capacitance portion 32 that are extracted to second end surface 13b.

An interval in lamination direction T between first external electrode 21 and third external electrode 23 that are provided on first end surface 13a is preferably not less than about 15 µm, for example. By setting the aforementioned interval to not less than about 15 µm, a short circuit between first external electrode 21 and third external electrode 23 can be reduced or prevented. To more effectively reduce or prevent the occurrence of a short circuit, the aforementioned interval is more preferably not less than about 50 µm, for example.

For a similar reason, an interval in lamination direction T between second external electrode 22 and fourth external electrode 24 that are provided on second end surface 13b is preferably not less than about 15 µm, and more preferably not less than about 50 µm, for example.

First external electrode 21, second external electrode 22, third external electrode 23 and fourth external electrode 24 each include, for example, an underlying electrode layer, and a plated layer disposed on the underlying electrode layer.

The underlying electrode layer includes at least one of a baked electrode layer, a resin electrode layer, a thin-film electrode layer and the like, as described below.

The baked electrode layer is a layer including glass and metal. One baked electrode layer or a plurality of baked electrode layers may be provided. The metal of the baked electrode layer preferably includes, for example, at least one selected from among Cu, Ni, Ag, Pd, Au, or an alloy of Ag and Pd. The glass of the baked electrode layer preferably includes at least one selected from among B, Si, Ba, Mg, Al, Li and the like, for example. A portion greatest in thickness of the baked electrode layer preferably has a thickness of not less than about 1 µm and not more than about 20 µm, for example.

The baked electrode layer is formed by applying a conductive paste including glass and metal to the ceramic body and baking the same. The baking may be performed simultaneously with or subsequently to firing of the ceramic body.

The resin electrode layer can be defined by, for example, a layer including conductive particles and a thermosetting resin. When the resin electrode layer is formed, the resin electrode layer may be formed directly on the ceramic body without forming the baked electrode layer. One resin electrode layer or a plurality of resin electrode layers may be provided.

The thin-film electrode layer is preferably, for example, a layer of not more than about 1 µm formed by deposition of metal particles, and can be formed with a known thin film formation method such as, for example, sputtering or vapor deposition.

The plated layer on the underlying electrode layer preferably includes at least one of metals such as Cu, Ni, Ag, Pd, and Au, or an alloy of Ag and Pd, for example. One plated layer or a plurality of plated layers may be provided. Each plated layer preferably has a thickness of not less than about 1 µm and not more than about 5 µm, for example.

When the plated layer is defined by a plurality of layers, one metal selected from the group of Cu, Au, Ag, and Al or an alloy including the metal, for example, is preferably used as a metal defining an outermost layer of the plated layer.

In particular, for reasons described later, Cu is preferably used as the metal forming the outermost layer of the plated layer.

Multilayer ceramic capacitor 100 in the present preferred embodiment can be used when embedded in a substrate. In that case, the substrate in which multilayer ceramic capacitor 100 has been embedded can be provided with through holes, through which other electronic components provided on a surface of the substrate can be electrically connected to multilayer ceramic capacitor 100. The through holes defined and function as connecting conductors that electrically connect the other electronic components provided on the surface of the substrate to external electrodes 21 to 24 of multilayer ceramic capacitor 100. The through hole can be formed by, for example, forming a hole with a laser such as a $CO_2$ laser, and conducting plating treatment on a side surface of the hole.

When forming a hole in the substrate with a laser, if external electrodes 21 to 24 have a low reflectivity to laser, the laser may reach the inside of multilayer ceramic capacitor 100, causing damage to multilayer ceramic capacitor 100. For this reason, the outermost layer of the plated layer of each of external electrodes 21 to 24 preferably includes a metal having a high reflectivity to laser, such as Cu, for example.

The outermost layer of the plated layer of each of external electrodes 21 to 24 may have an oxidized surface. In that case, it is preferable that at least a ridgeline portion of each of external electrodes 21 to 24 be oxidized. By oxidizing the outermost layer of the plated layer to form an oxide film, oxygen binding occurs between the oxide film and resin forming the substrate when multilayer ceramic capacitor 100 is embedded in the substrate, to improve adhesion between multilayer ceramic capacitor 100 and the substrate. To improve the adhesion, it is more preferable that external electrodes 21 to 24 is entirely or substantially entirely oxidized.

To reduce the dimension in lamination direction T of multilayer ceramic capacitor 100, external electrodes 21 to 24 may each be partially embedded, more specifically, the underlying electrode layer may be partially embedded, in ceramic body 10. External electrodes 21 to 24 can each be partially embedded in ceramic body 10 by, for example, being pressed in lamination direction T.

Figure 4:
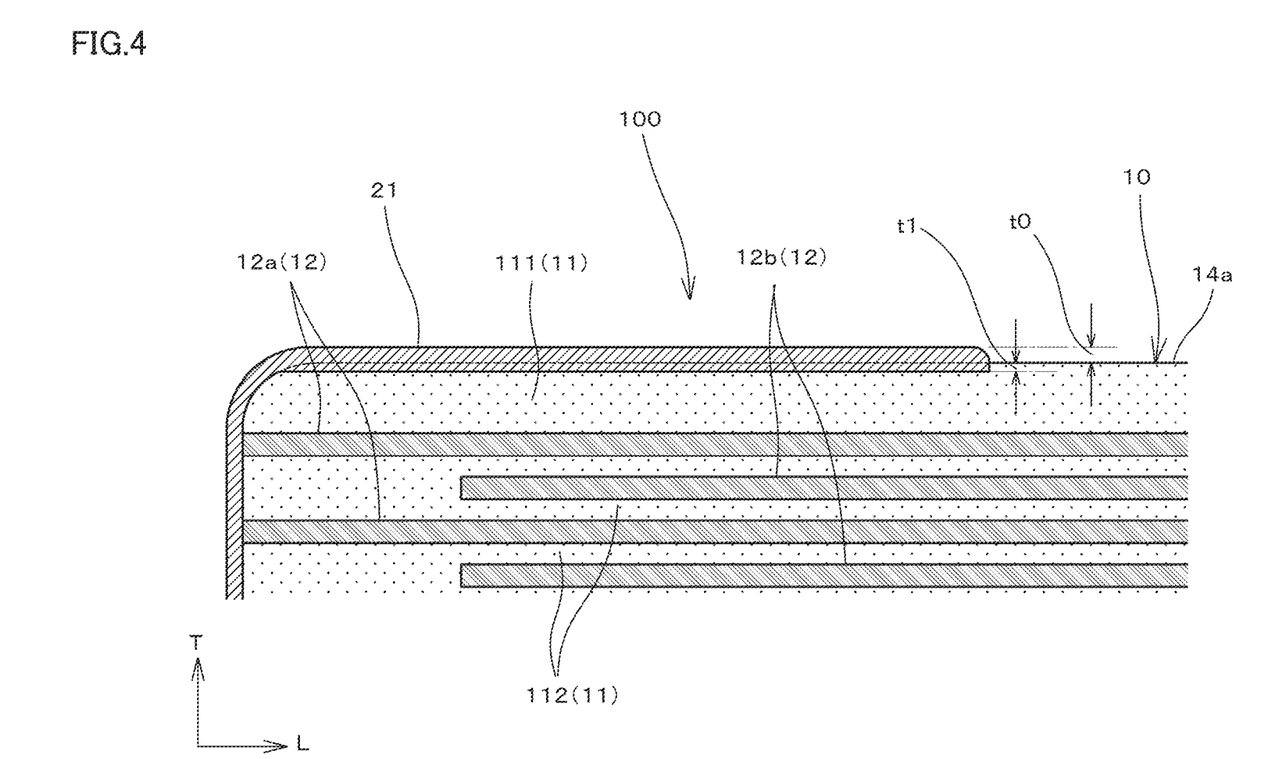
FIG. 4 is a partial enlarged cross-sectional view showing a first external electrode as partially embedded in a ceramic body according to a preferred embodiment of the present invention.

FIG. 4 is a partial enlarged cross-sectional view showing first external electrode 21 as partially embedded in ceramic body 10. As shown in FIG. 4, on the side of first main surface 14a of ceramic body 10, first external electrode 21 is partially embedded in ceramic body 10. In FIG. 4, the outline of ceramic body 10 with first external electrode 21 not being partially embedded is indicated by a dotted line.

It is preferable that a relationship of the following expression (1) is maintained, with t0 representing the thickness of a portion of first external electrode 21 that is located on first main surface 14a of ceramic body 10, and t1 representing the thickness of a portion of first external electrode 21 that is embedded in ceramic body 10. It is noted that thicknesses t0 and t1 represent the thicknesses at the position of a central portion in width direction W.

$$(1/10) \times t0 \leq t1 (2/5) \times t0 \tag{1}$$

Although not shown, second external electrode 22, third external electrode 23, and fourth external electrode 24 can also be configured similarly.

When thickness t1 is less than $(1/10) \times t0$, adhesion between external electrodes 21 to 24 and ceramic body 10 may decrease to cause removal of external electrodes 21 to 24, resulting in lowered reliability. When thickness t1 is less than $(1/10) \times t0$, the portion located on the surface of ceramic body 10 increases in thickness, making it difficult to sufficiently reduce the thickness of multilayer ceramic capacitor 100.

When thickness t1 is more than $(2/5) \times t0$, the reliability of multilayer ceramic capacitor 100 may be lowered. Specifically, when embedding external electrodes 21 to 24 in ceramic body 10 by pressing the electrodes, internal electrodes 12a, 12b, 12c and 12d may be placed under high stress and damaged, resulting in failure to obtain a desired capacitance, or in a short circuit between adjacent internal electrodes 12a and 12b and between adjacent internal electrodes 12c and 12d.

The amount of embedding of external electrodes 21 to 24 in ceramic body 10 can be measured with a method below. First, a surface defined by length direction L and lamination direction T of multilayer ceramic capacitor 100 is polished to the position of the central portion in width direction W of multilayer ceramic capacitor 100, to expose the cross section. Then, the thickness of each of external electrodes 21 to 24 exposed at the cross section is measured with an optical microscope or the like.

An edge in length direction L of each of external electrodes 21 to 24 on first main surface 14a and second main surface 14b of ceramic body 10 preferably has a substantially linear shape, and more preferably has a linear shape.

Figure 5:
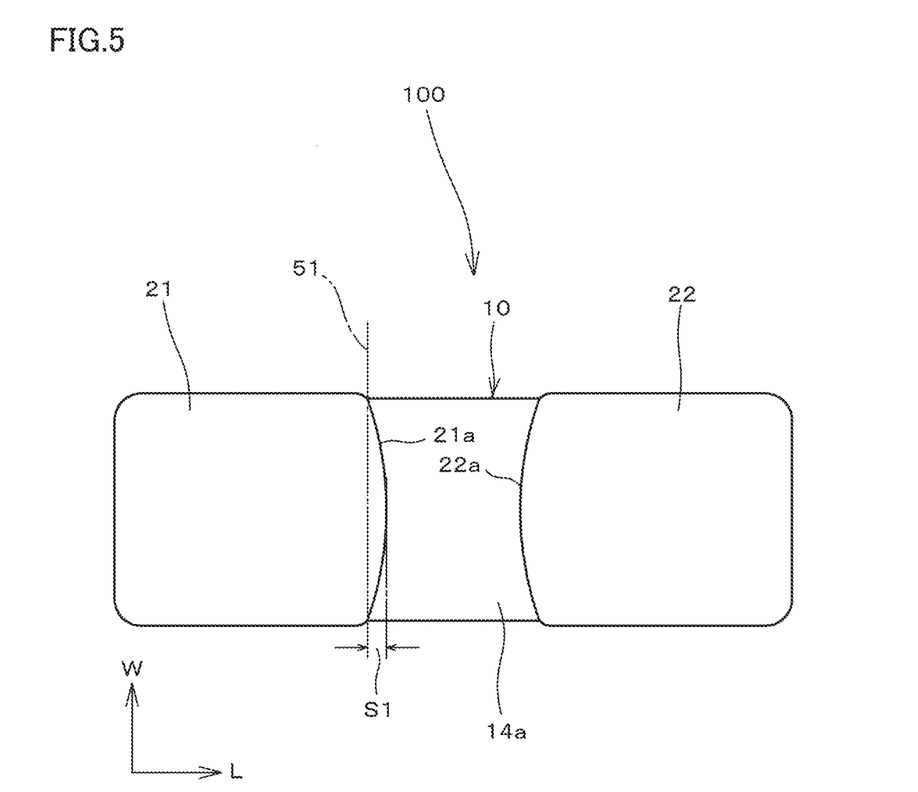
FIG. 5 is a top view of a side of a first main surface of the multilayer ceramic capacitor according to a preferred embodiment of the present invention.

FIG. 5 is a top view of the side of first main surface 14a of multilayer ceramic capacitor 100. The substantially linear shape and the linear shape will be described with reference to the shape of an edge 21a of first external electrode 21 shown in FIG. 5.

A line 51 connects the opposite ends in width direction W of edge 21a in length direction L of a portion of first external electrode 21 shown in FIG. 5 that is located on first main surface 14a. When a distance S1 between line 51 and an outermost position in length direction L of edge 21a is not more than about 30 μm, for example, the shape of edge 21a in length direction L of first external electrode 21 is defined as the substantially linear shape. When the aforementioned distance S1 is 0, the shape of edge 21a in length direction L of first external electrode 21 is defined as the linear shape. This is also the case with second external electrode 22, third external electrode 23, and fourth external electrode 24.

While FIG. 5 shows an example where edge 21a of first external electrode 21 has a shape bulging toward second external electrode 22, and an edge 22a of second external electrode 22 has a shape bulging toward first external electrode 21, the above applies also when they have shapes bulging in the opposite directions in length direction L.

By providing the linear shape or the substantially linear shape for the shape of the edge of each of external electrodes 21 to 24, misalignment between the through holes defined in the substrate and external electrodes 21 to 24 can be reduced or prevented when multilayer ceramic capacitor 100 is embedded in the substrate. In particular, when the edge of each of external electrodes 21 to 24 bulges toward the end surface instead of toward another outer electrode on the same main surface, misalignment between the through holes in the substrate and external electrodes 21 to 24 can be effectively reduced or prevented.

Method of Manufacturing Multilayer Ceramic Capacitor

A non-limiting example of a method of manufacturing a multilayer ceramic capacitor according to a preferred embodiment of the present invention will be described below.

First, ceramic green sheets, a conductive paste used to make internal electrodes, and a conductive paste used to make external electrodes are prepared. The ceramic green sheets, the conductive paste used to make internal electrodes, and the conductive paste used to make external electrodes used can each be of a known type including an organic binder and an organic solvent.

Then, the conductive paste used to make internal electrodes is printed on the ceramic green sheets to form an internal electrode pattern. The conductive paste used to make internal electrodes can be printed, for example, with a printing method such as screen printing or gravure printing.

Then, a prescribed number of ceramic green sheets not having the internal electrode pattern formed thereon are laminated, a ceramic green sheet having the internal electrode pattern formed thereon is laminated thereon, a prescribed number of ceramic green sheets not having the internal electrode pattern formed thereon are laminated thereon, a ceramic green sheet including the internal electrode pattern formed thereon is laminated thereon, and lastly, a prescribed number of ceramic green sheets not having the internal electrode pattern formed thereon are laminated, to fabricate a mother laminate.

Then, the conductive paste used to make external electrodes which will be the underlying electrode layers of the external electrodes is printed on prescribed regions of an upper surface and a lower surface of the mother laminate, to form an external electrode pattern. The conductive paste used to make external electrodes can be printed, for example, with a printing method such as screen printing or gravure printing.

Then, the mother laminate including the external electrode pattern formed thereon is pressed in the lamination direction using a rigid body press, a hydrostatic pressure press, or the like. The pressing causes the external electrode pattern to be partially embedded in the ceramic green sheets located on an outer side of the mother laminate.

The amount of embedding of the external electrode pattern can be adjusted to a desired value by adjustment of, for example, the amount of pressing, the pressure of pressing, and the hardness and the coefficient of elasticity of a pressing member that comes into contact with the mother laminate during the pressing. For example, the amount of embedding increases if the pressing is performed without an elastic body such as rubber interposed between the pressing member and the mother laminate, and the amount of embedding decreases if the pressing is performed with the elastic body interposed therebetween. When the elastic body is interposed, the amount of embedding can also be adjusted by adjustment of the coefficient of elasticity of the elastic body.

Then, the pressed mother laminate is cut into a prescribed size with a cutting method such as press-cutting, dicing, or laser, for example, to provide a laminated chip. Then, a corner portion and a ridgeline portion of the laminated chip may be rounded through barrel polishing or the like.

Then, to form the underlying electrode layer on the side of the end surface of the external electrode, the conductive paste used to make external electrodes is applied with a dipping method or the like, for example, to a prescribed region of each of opposite end surfaces of the laminated chip.

The laminated chip is then fired. A firing temperature is not less than about 900° C. and not more than about 1300° C., for example, although depending on a ceramic material or a material for the conductive paste used. As a result, the ceramic green sheets, the internal electrode pattern, and the external electrode pattern are simultaneously fired. Subsequently, polishing such as barrel polishing is performed as necessary.

Then, plating treatment is conducted on the underlying electrode layer of the external electrode, to form a plated layer. The plating treatment may be conducted by electrolytic plating or by electroless plating, for example. Electroless plating requires pre-treatment with a catalyst and the like for improving a rate of plating deposition, resulting in a complicated process of the plating treatment. Therefore, the plating treatment is preferably conducted by electrolytic plating, for example. When a plurality of plated layers are formed, another one or more plated layers are formed.

Then, heat treatment is conducted on the plated layer, to increase an average crystal grain size of the metal of the plated layer through grain growth. A heat treatment temperature is preferably a temperature at which the crystal grain size of the metal of the plated layer increases through grain growth and the metal of the plated layer does not melt, for example, not less than about 400° C. and not more than about 800° C.

The multilayer ceramic capacitor can be manufactured through the steps described above.

Multilayer Ceramic Capacitor Mount Structure

Multilayer ceramic capacitor 100 described above can be used when embedded in a substrate.

Figure 6:
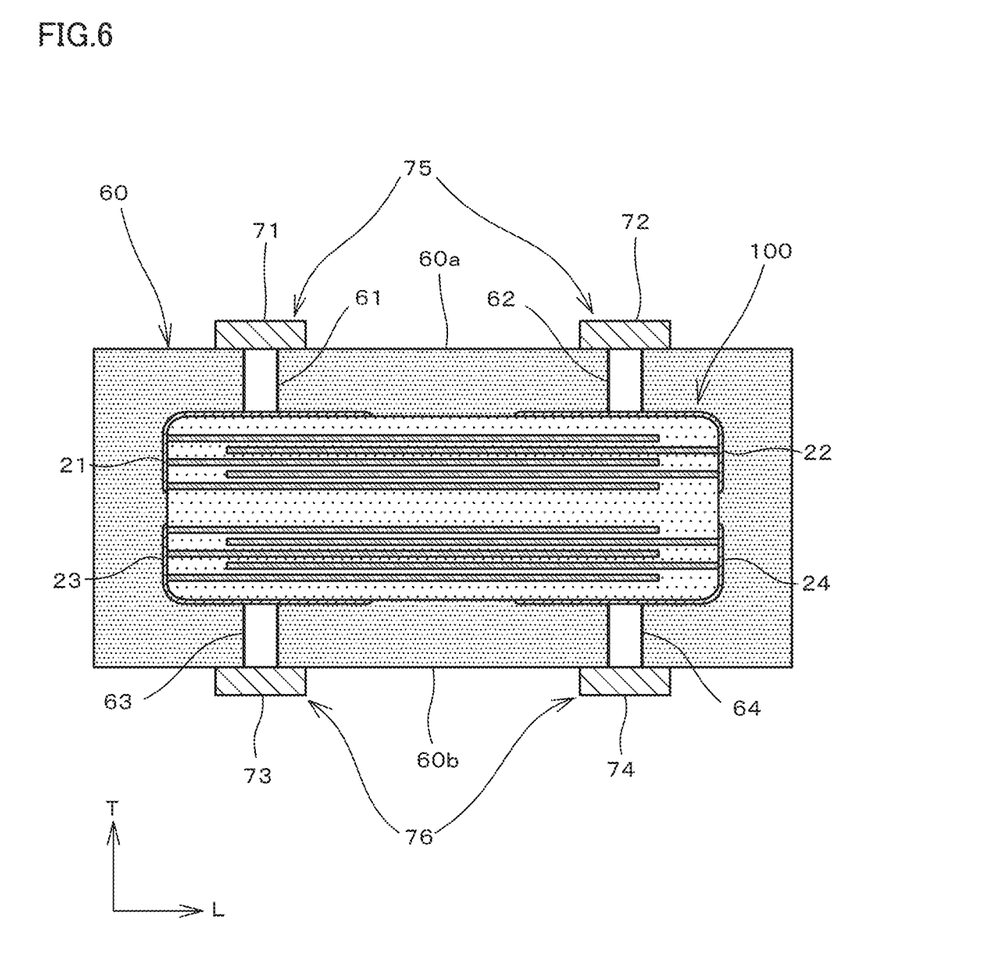
FIG. 6 is a side cross-sectional view of an example of a multilayer ceramic capacitor mount structure according to a preferred embodiment of the present invention, showing the multilayer ceramic capacitor as embedded in a substrate.

FIG. 6 is a side cross-sectional view of an example of a multilayer ceramic capacitor 100 mount structure, showing multilayer ceramic capacitor 100 as embedded in a substrate 60. Substrate 60 is made of resin, for example.

First external electrode 21 of multilayer ceramic capacitor 100 is electrically connected to a first electronic component 71 provided on a first main surface 60a of substrate 60, with a first connecting conductor 61 provided within substrate 60 interposed therebetween. Second external electrode 22 is electrically connected to a second electronic component 72 provided on first main surface 60a of substrate 60, with a second connecting conductor 62 provided within substrate 60 interposed therebetween.

Third external electrode 23 of multilayer ceramic capacitor 100 is electrically connected to a third electronic component 73 provided on a second main surface 60b of substrate 60, with a third connecting conductor 63 provided within substrate 60 interposed therebetween. Fourth external electrode 24 is electrically connected to a fourth electronic component 74 provided on second main surface 60b of substrate 60, with a fourth connecting conductor 64 provided within substrate 60 interposed therebetween.

In the present preferred embodiment, first electronic component 71 and second electronic component 72 are electronic components which define a first circuit 75, and third electronic component 73 and fourth electronic component 74 are electronic components which define a second circuit 76. First electronic component 71, second electronic component 72, third electronic component 73 and fourth electronic component 74 are not particularly limited in type as long as they define a circuit. They may each be an active element such as a CPU, or a passive element such as a resistor or a capacitor, for example. A conductor connecting the electronic components may be included.

In the present preferred embodiment, first connecting conductor 61 is a through hole extending from first main surface 60a of substrate 60 to first external electrode 21 of multilayer ceramic capacitor 100, and is structured such that the hole has a plated side surface. Second connecting conductor 62 is a through hole extending from first main surface 60a of substrate 60 to second external electrode 22 of multilayer ceramic capacitor 100, and is structured such that the hole has a plated side surface.

Third connecting conductor 63 is a through hole extending from second main surface 60b of substrate 60 to third external electrode 23 of multilayer ceramic capacitor 100, and is structured such that the hole has a plated side surface. Fourth connecting conductor 64 is a through hole extending from second main surface 60b of substrate 60 to fourth external electrode 24 of multilayer ceramic capacitor 100, and is structured such that the hole has a plated side surface.

The through holes defining first connecting conductor 61, second connecting conductor 62, third connecting conductor 63 and fourth connecting conductor 64 can be formed with a laser such as a $CO_2$ laser, for example. However, the structure of first connecting conductor 61, second connecting conductor 62, third connecting conductor 63 and fourth connecting conductor 64 is not limited to the structure described above.

As described above, first external electrode 21, second external electrode 22, third external electrode 23 and fourth external electrode 24 of multilayer ceramic capacitor 100 each preferably include a plated layer including, for example, Cu as the outermost layer.

The present invention is not limited to the preferred embodiment described above, and can be applied and modified in various ways within the scope of the present invention.

Figure 7:
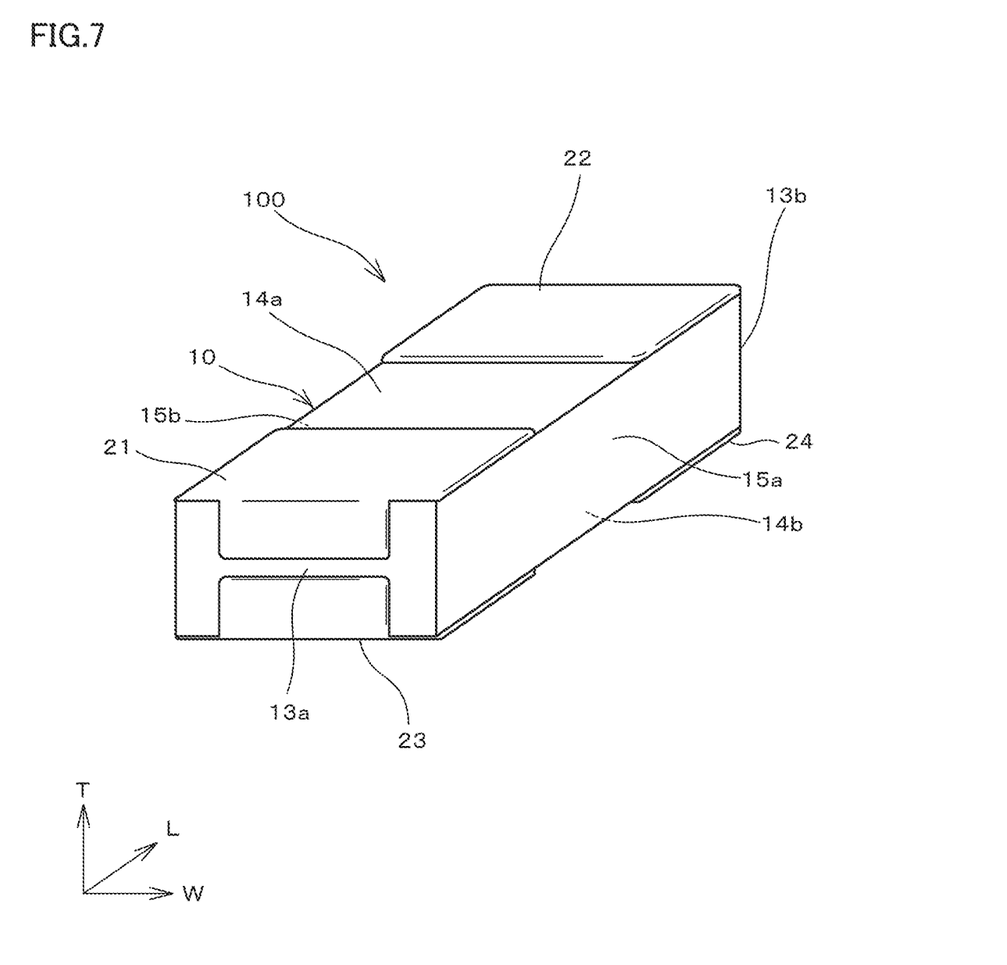
FIG. 7 is a perspective view of the multilayer ceramic capacitor according to a preferred embodiment of the present invention including external electrodes in another shape.
Figure 8:
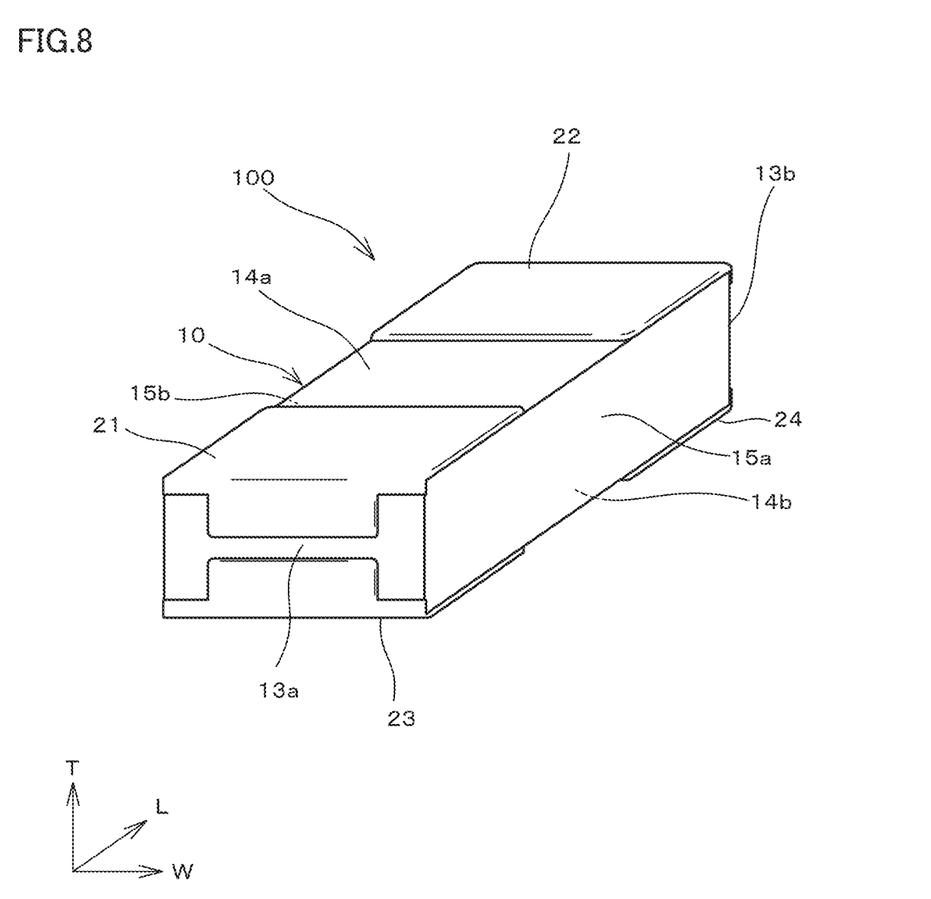
FIG. 8 is a perspective view of the multilayer ceramic capacitor according to a preferred embodiment of the present invention including external electrodes in yet another shape.
Figure 9:
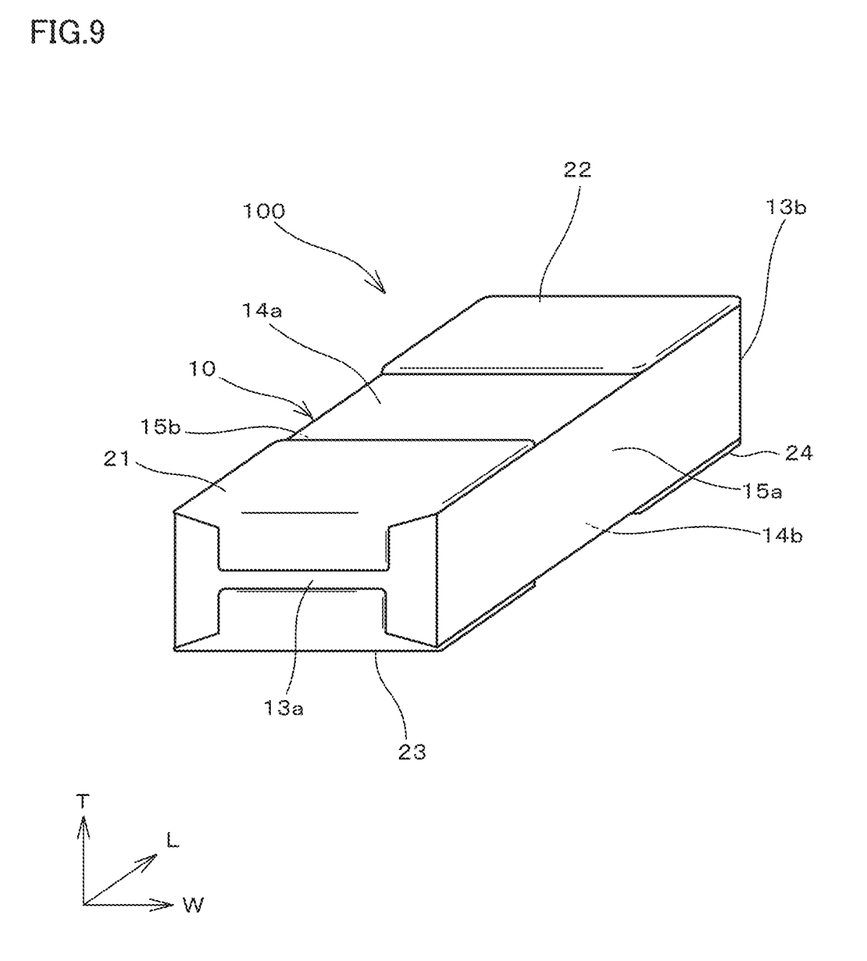
FIG. 9 is a perspective view of the multilayer ceramic capacitor according to a preferred embodiment of the present invention including external electrodes in yet another shape.

For example, the shape of first external electrode 21, second external electrode 22, third external electrode 23 and fourth external electrode 24 is not limited to the shape shown in FIG. 1. FIGS. 7 to 9 show examples of other shapes of first external electrode 21, second external electrode 22, third external electrode 23 and fourth external electrode 24.

First external electrode 21 shown in FIG. 7 includes a smaller region on first end surface 13a than first external electrode 21 shown in FIG. 1. That is, first external electrode 21 shown in FIG. 7 is different from first external electrode 21 shown in FIG. 1 in that it is only in a central region in width direction W on first end surface 13a. This region is a region covering the plurality of first internal electrodes 12a exposed at first end surface 13a, and first external electrode 21 is not on the outer sides in width direction W where first internal electrodes 12a are not exposed. As shown in FIG. 7, second external electrode 22, third external electrode 23 and fourth external electrode 24 are also provided in a manner similar to that of first external electrode 21. Such external electrodes 21 to 24 can be formed, for example, by plating deposition.

First external electrode 21 shown in FIG. 8 is different in that it extends up to regions on the outer sides in width direction W on first end surface 13a on the side of first main surface 14a, from first external electrode 21 shown in FIG. 7 which is not in the regions on the outer sides in width direction W. As shown in FIG. 8, second external electrode 22, third external electrode 23 and fourth external electrode 24 are provided in a manner similar to that of first external electrode 21. External electrodes 21 to 24 shown in FIG. 8 can be defined by, for example, providing dummy internal electrodes having a larger dimension in width direction W than first internal electrode 12a and second internal electrode 12b on the opposite outer sides in lamination direction T and exposing the dummy internal electrodes at first end surface 13a and second end surface 13b, and depositing plating around regions where the internal electrodes are exposed.

First external electrode 21 shown in FIG. 9 is provided such that its portion on first end surface 13a gradually decreases in dimension in width direction W with increasing distance from the side of first main surface 14a, and then becomes substantially constant in dimension in width direction W from a certain position. As shown in FIG. 9, second external electrode 22, third external electrode 23 and fourth external electrode 24 are formed in a manner similar to that of first external electrode 21. Also in this case, external electrodes 21 to 24 can be formed by providing dummy internal electrodes and depositing plating, with the dummy internal electrodes being disposed to increase in dimension in width direction W with decreasing distance to first main surface 14a or to second main surface 14b.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor, comprising:
a ceramic body including a plurality of laminated dielectric layers and a plurality of laminated internal electrodes, the ceramic body including a first main surface and a second main surface opposing each other in a lamination direction, a first side surface and a second side surface opposing each other in a width direction orthogonal or substantially orthogonal to the lamination direction, and a first end surface and a second end surface opposing each other in a length direction orthogonal or substantially orthogonal to both the lamination direction and the width direction;
a first external electrode on the first end surface on a side of the first main surface of the ceramic body;
a second external electrode on the second end surface on a side of the first main surface of the ceramic body;
a third external electrode on the first end surface on a side of the second main surface of the ceramic body; and
a fourth external electrode on the second end surface on a side of the second main surface of the ceramic body; wherein
the ceramic body includes a first capacitance portion and a second capacitance portion aligned with each other in the lamination direction;
the first external electrode is electrically connected to the internal electrodes in the first capacitance portion that are extracted to the first end surface;
the second external electrode is electrically connected to the internal electrodes in the first capacitance portion that are extracted to the second end surface;
the third external electrode is electrically connected to the internal electrodes in the second capacitance portion that are extracted to the first end surface;
the fourth external electrode is electrically connected to the internal electrodes in the second capacitance portion that are extracted to the second end surface; and
a total dimension in the lamination direction of the ceramic body is smaller than a total dimension in the width direction of the ceramic body.

2. The multilayer ceramic capacitor according to claim 1, wherein the total dimension in the lamination direction of the ceramic body is not more than about 0.21 mm.

3. The multilayer ceramic capacitor according to claim 1, wherein each of the first external electrode, the second external electrode, the third external electrode, and the fourth external electrode includes a plated layer including Cu as an outermost layer.

4. The multilayer ceramic capacitor according to claim 1, wherein one of the first capacitance portion and the second capacitance portion has a capacitance of about 0.01 μF±10%, and another one of the first capacitance portion and the second capacitance portion has a capacitance of about 0.1 μF±10%.

5. A multilayer ceramic capacitor mount structure, wherein
the multilayer ceramic capacitor according to claim 1 is embedded in a substrate;
the first external electrode and the second external electrode are electrically connected to a first circuit provided on a first main surface of the substrate, with a first connecting conductor and a second connecting conductor provided within the substrate interposed therebetween, respectively; and
the third external electrode and the fourth external electrode are electrically connected to a second circuit on a second main surface of the substrate, with a third connecting conductor and a fourth connecting conductor provided within the substrate interposed therebetween, respectively.

6. The multilayer ceramic capacitor according to claim 1, wherein
a relationship of T1<W1<L1 is satisfied, where:
L1 represents a dimension in the length direction of the ceramic body;
W1 represents a dimension in the width direction of ceramic body; and
T1 represents a dimension in lamination direction of ceramic body.

7. The multilayer ceramic capacitor according to claim 1, wherein
a corner portion is defined by a portion where three of the first main surface, the second main surface, the first side surface, the second side surface, the first end surface, and the second end surface meet one another;
a ridgeline portion is defined by a portion where two of the first main surface, the second main surface, the first side surface, the second side surface, the first end surface, and the second end surface meet one another; and
the corner portion and the ridgeline portion are both rounded.

8. The multilayer ceramic capacitor according to claim 1, wherein the plurality of laminated dielectric layers are made of a ceramic material including at least one of $BaTiO_3$, $CaTiO_3$, $SrTiO_3$, and $CaZrO_3$.

9. The multilayer ceramic capacitor according to claim 1, wherein a glass layer is provided at a first portion where the first internal electrode and the third internal electrode are exposed at the first end surface, and at a second portion where the second internal electrode and the fourth internal electrode are exposed at the second end surface.

10. The multilayer ceramic capacitor according to claim 1, wherein the first external electrode, the second external electrode, the third external electrode, and the fourth external electrode each include an underlying electrode layer and a plated layer on the underlying electrode layer.

11. The multilayer ceramic capacitor mount structure according to claim 5, wherein an outermost surface of each of the first external electrode, the second external electrode, the third external electrode, and the fourth external electrode includes an oxidized surface.

12. The multilayer ceramic capacitor according to claim 1, wherein portions of the first external electrode, the second external electrode, the third external electrode, and the fourth external electrode are partially embedded within the ceramic body.

13. The multilayer ceramic capacitor according to claim 1, wherein the first external electrode, the second external electrode, the third external electrode, and the fourth external electrode include edges which extend in the lamination direction and have dimensions that decrease in the width direction.

* * * * *

UNITED STATES PATENT AND TRADEMARK OFFICE
CERTIFICATE OF CORRECTION

PATENT NO. : 11,158,462 B2
APPLICATION NO. : 16/787067
DATED : October 26, 2021
INVENTOR(S) : Hironori Tsutsumi It is certified that error appears in the above-identified patent and that said Letters Patent is hereby corrected as shown below:

On the Title Page

Item (73), for the Assignee, change "MURATA MANUFACTURING COMPANY, LTD., Kyoto (JP)" to --MURATA MANUFACTURING CO., LTD., Kyoto (JP)--

Signed and Sealed this
Seventh Day of February, 2023

Katherine Kelly Vidal
*Director of the United States Patent and Trademark Office*